United States Patent [19]
Horrion et al.

[11] Patent Number: 5,777,029
[45] Date of Patent: *Jul. 7, 1998

[54] CO-CURED RUBBER-THERMOPLASTIC ELASTOMER COMPOSITIONS

[75] Inventors: Jacques Horrion, Tilff, Belgium; Raman Patel, Akron, Ohio; Sabet Abdou-Sabet, Akron, Ohio; Krishna Venkataswamy, Akron, Ohio

[73] Assignee: Advanced Elastomer Systems, L.P., Akron, Ohio

[*] Notice: The term of this patent shall not extend beyond the expiration date of Pat. No. 5,589,544.

[21] Appl. No.: 686,799

[22] Filed: Jul. 26, 1996

[51] Int. Cl.$^6$ .................. C08L 53/00; C08F 8/00
[52] U.S. Cl. .............. 525/92 F; 525/119; 525/148; 525/176; 525/222
[58] Field of Search ................... 525/148, 119, 525/176, 92 F, 222

[56] References Cited

U.S. PATENT DOCUMENTS

| | | | |
|---|---|---|---|
| 4,348,502 | 9/1982 | Coran et al. | 525/183 |
| 4,474,927 | 10/1984 | Novak | 525/66 |
| 4,694,042 | 9/1987 | McKee et al. | 525/66 |
| 4,871,810 | 10/1989 | Saltman | 525/137 |
| 4,996,264 | 2/1991 | Aonuma et al. | 525/179 |
| 5,003,003 | 3/1991 | Olivier | 525/66 |
| 5,180,777 | 1/1993 | Padwa et al. | 525/66 |
| 5,231,138 | 7/1993 | Aonuma et al. | 525/179 |
| 5,300,573 | 4/1994 | Patel | 525/107 |
| 5,574,105 | 11/1996 | Venkataswamy | 525/179 |
| 5,589,544 | 12/1996 | Horrion | 525/176 |
| 5,591,798 | 1/1997 | Patel | 524/514 |

FOREIGN PATENT DOCUMENTS 0 337 976 A2  10/1989  European Pat. Off. .

*Primary Examiner*—Randy Gulakowski
*Attorney, Agent, or Firm*—Daniel J. Hudak; Laura F. Shunk; William A. Skinner

[57] ABSTRACT

A thermoplastic elastomer composition has a plastic phase or matrix of an engineering thermoplastic such as an ester polymer and a crosslinked phase of cured acrylic rubbers. The rubbers are cured by a curing agent and contain at least two functionalized acrylic rubbers wherein the functional group such as a carboxyl, an epoxy, or a hydroxyl can be the same or different. The composition can be dynamically vulcanized and desirably when one of the functionalized acrylic rubbers is a terpolymer of ethylene-alkyl acrylate-unsaturated carboxylic acid, the composition has a single low temperature brittle point.

15 Claims, No Drawings

5,777,029

1

CO-CURED RUBBER-THERMOPLASTIC ELASTOMER COMPOSITIONS

FIELD OF THE INVENTION

The present invention relates to thermoplastic elastomers made from two or more functionalized acrylic rubbers. The curing agent, which can be utilized either in small or large amounts, cures generally through the formation of either a covalent or an ionic bond and includes compounds such as various peroxides, magnesium oxide, and various epoxidized soybean oils. The present invention also relates to the dynamic vulcanization of the two or more functionalized acrylic rubbers in the presence of a thermoplastic polymer such as an ester polymer. The dynamically vulcanized composition desirably has a single low temperature brittle point.

BACKGROUND OF THE INVENTION

Thermoplastic elastomers are materials which exhibit both thermoplastic and elastomeric properties, i.e., the materials can be processed as thermoplastics but have physical properties common to elastomers. Shaped articles can be formed from thermoplastic elastomers by extrusion, injection molding or compression molding without the time-consuming cure step required with conventional vulcanizates. Further, thermoplastic elastomers can be reprocessed without the need for reclaiming and, in addition, many thermoplastic elastomers can be thermally welded.

U.S. Pat. No. 5,300,573 to Patel relates to thermoplastic elastomer compositions comprising blends of polyester resin and to a single covalently crosslinked acrylic rubber.

SUMMARY OF THE INVENTION

The invention generally relates to a blend of two or more functionalized acrylic rubber components which are cured in the presence of a curing agent and an engineering thermoplastic. The functional groups can either be the same or different. One of the functionalized acrylic rubbers desirably is a terpolymer derived from ethylene, alkyl acrylate, and unsaturated carboxylic acid monomers and upon cure, the composition unexpectedly has only a single low temperature brittle point. The degree of cure of the two or more acrylic rubbers is generally at least 80 percent. The thermoplastic elastomers when cured have a good balance of properties such as good low temperature physical properties and low oil swell.

DETAILED DESCRIPTION OF THE INVENTION

The thermoplastic elastomer compositions of the present invention generally contain a plastic phase or matrix of an engineering thermoplastic polymer which is compatible with the two or more functionalized acrylic rubber components.

Suitable thermoplastic polymers include the various ester polymers such as polyester, copolyester, a polyester block copolymer, or polycarbonate, etc., an epoxy endcapped derivative thereof, and mixtures thereof. The various polyesters can be either aromatic or aliphatic or combinations thereof and are generally directly or indirectly derived from the reactions of diols such as glycols having a total of from 2 to 12 carbon atoms and desirably from about 2 to about 4 carbon atoms with aliphatic acids having a total of from 2 to 20 carbon atoms and desirably from about 3 to about 15 carbon atoms or from aromatic acids having a total of from about 8 to about 15 carbon atoms. Generally, aromatic polyesters are preferred such as polyethyleneterephthalate, polybutyleneterephthalate, polyethyleneisophthalate, polynaphthalenephthalate, and the like, as well as endcapped epoxy derivative thereof, e.g., a monofunctional epoxy polybutyleneterephthalate. Various polycarbonates can also be utilized and the same are esters of carbonic acid. A suitable polycarbonate is that based on bisphenol A. i.e., poly(carbonyldioxyl,4-phenyleneisopropylidene-1,4-phenylene). The various ester polymers also include block polyesters such as those containing at least one block of a polyester and at least one rubbery block such as a polyether derived from glycols having from 2 to 6 carbon atoms, e.g., polyethylene glycol, or from alkylene oxides having from 2 to 6 carbon atoms. A preferred block polyester is polybutyleneterephthalate-b-polyethylene glycol which is available as Hytrel from DuPont.

The amount of the one or more engineering thermoplastics is generally from about 5 to about 95 parts by weight, desirably from about 15 to about 60 parts by weight and preferably from about 20 to about 40 parts by weight based upon 100 parts by weight of all of the two or more functionalized acrylic rubbers.

Considering the at least two functionalized acrylic rubber components, they are generally compatible with each other and also with the engineering thermoplastic. Excluded from the present invention or substantially free thereof (i.e., less than 5 percent, less than 3 percent, less than 1 percent, and preferably nil percent by weight based upon 100 parts by weight of the total acrylic rubbers) are nitrile groups, for example, acrylonitrile containing rubbers such as nitrile rubbers. The two or more functionalized acrylic rubber components can be derived from an alkyl acrylate wherein the alkyl portion has from 1 to 10 carbon atoms with from 1 to 3 carbon atoms being desired. Specific examples include polymers of ethyl acrylate, butyl acrylate, ethyl-hexyl acrylate, and the like. Other suitable acrylic rubbers include copolymers of ethylene and the above noted alkyl acrylates wherein the amount of ethylene is desirably high, e.g., from about 10 to about 90 mole percent, desirably from about 30 to about 70 mole percent, and preferably from about 40 to about 60 mole percent of ethylene repeat groups based upon the total number of moles of ethylene and acrylate repeat groups in the copolymer, so as to produce a rubber having polar and non-polar portions.

The two or more acrylic rubbers have a functional group which can be an acid, i.e., carboxyl group, an epoxy group, a hydroxy group, and the like. The two or more rubbers can have different functional groups or they can be the same functional group. Such functionalized acrylic rubber components are formed by utilizing various comonomers during polymerization of the above noted acrylic polymers. Suitable comonomers for adding hydroxyl groups include unsaturated alcohols having from about 2 to about 20 and desirably from 2 to about 10 carbon atoms. A specific example of a hydroxy functionalized acrylic rubber is Hytemp 4404 from Nippon-Zeon. To add pendent epoxy groups, suitable comonomers include unsaturated oxiranes such as oxirane acrylates wherein the oxirane group can contain from about 3 to about 10 carbon atoms and wherein the ester group of the acrylate is an alkyl having from 1 to 10 carbon atoms with a specific example being glycidyl acrylate. Another group of unsaturated oxiranes are the various oxirane alkenyl ethers wherein the oxirane group can have from about 3 to about 10 carbon atoms and the alkenyl group can also have from about 3 to about 10 carbon atoms with a specific example being allyl glycidyl ether.

Examples of epoxy functionalized acrylic rubbers include Acrylate AR-53 and Acrylate AR-31 from Nippon-Zeon, and the like. To add pendent carboxylic acid groups, suitable comonomers include unsaturated acids having from 2 to about 15 carbon atoms and desirably from 2 to 10 carbon atoms. Examples of acid functionalized acrylic rubbers include terpolymers of ethylene-acrylate-carboxylic acids such as Vamac G from DuPont, and various carboxyl functional acrylates made by Nippon-Zeon, and the like. The amount of the functional groups within any acrylic polymer can be up to about 10 mole percent, desirably from about 0.5 to about 6 mole percent, and preferably from about 1 to about 4 mole percent of the polymer, that is, of the total repeat groups therein.

Unexpectedly, it has been found that when an ethylene-alkyl acrylate-carboxylic acid terpolymer is utilized, the two or more acrylic rubber blends yield only one, i.e., a single, low temperature brittle point (LTB) and imparts good low temperature properties to the thermoplastic elastomer. The single LTB is generally minus 20° C. or lower, desirably minus 30° C., or lower, and preferably minus 40° C. or lower according to ASTM Test No. D-746. Moreover, such terpolymer blends have good oil resistance, that is, low oil swell. Such oil swell values are at least 10 percent, desirably at least 20 or 30 percent, and preferably at least 40, 50, or 60 percent lower than the oil swell value of the acrylic terpolymer. The oil swell values are generally from about 20 to about 65, and desirably from about 25 to about 40, 45 or 50 according to ASTM Test No. D-471 when utilizing ASTM reference oil #3 at 125° C. for 70 hrs. The combination of the single low temperature brittle point along with low oil swell values is highly desirable inasmuch as the thermoplastic elastomer compositions can be utilized in end products which are commercially desirable. For example, various seals, gaskets, etc., desirably having low oil swell values, for example, 40 or less as well as a single low temperature brittle point, i.e., minus 20° C. or less.

The utilization of a terpolymer as one of the functionalized acrylic rubber components is highly preferred. Such terpolymers generally contain from about 35 to about 80 mole percent and desirably from about 45 to about 55 mole percent of ethylene repeat groups, generally from about 0.5 to about 10 mole percent and desirably from about 2 to about 8 mole percent of acid repeat groups, and generally from about 10 to about 60 mole percent and desirably from about 37 to about 50 mole percent of alkyl acrylate repeat groups based upon the total number of repeat groups in the terpolymer. The acid repeat groups are generally derived from acrylic acid or methacrylic acid. A specific commercially available compound is Vamac G, manufactured by DuPont, which generally has about 50 mole percent ethylene, about 45 mole percent of methyl acrylate, and about 5 mole percent of acrylic acid. The amount of the terpolymer is generally important to obtain highly desired properties of a low single temperature brittle point and good oil swell values. Accordingly, the amount of terpolymer utilized is generally from about 25 to about 75, desirably from about 40 to about 60, and preferably from about 45 to about 50 parts by weight based upon 100 total parts by weight of all acrylic rubbers.

Effective amounts of one or more curing agents are utilized to cocure the functionalized acrylic rubbers and obtain suitable thermoplastic elastomeric properties. Such effective amounts generally result in a degree of cure of at least about 80 percent, desirably at least about 90 or 95 percent, and preferably at least about 97 percent, 98 percent, 99 percent, and even 100 percent, i.e., complete cure. The degree of cure is readily determined by the amount of undissolved acrylic rubber in toluene at 20° C. Suitable crosslinking agents cure the two or more functionalized acrylate rubbers by either covalently bonding or ionically bonding with the reactive functional groups. Examples of such crosslinking agents include various isocyanates such as toluene diisocyante, isocyanate terminated polyester prepolymers, various polyols such as pentaerythritol or diols such as bisphenol-A, various polyamines such as methylene dianiline and diphenyl guanidine, various epoxides such as the diglycidyl ether of bisphenol A, and various epoxidized oils such as soybean oil, and the like.

When an epoxidized oil is utilized, it often, but not always, contains at least two internal oxirane groups and typically, but not always, contain some unsaturation. By the term "internal" it is meant that the oxirane group is not bonded to the terminal or end carbon atom of the oil molecule and often is not in part bonded to either of the two end carbon atoms of each terminal portion of the oil molecule. Upon heating the rings open and react with the acrylic rubber to crosslink or cure the same. The epoxidized oils are generally known to the art and to the literature and are generally derived from plants such as vegetables, animals, or petroleum. The oils are generally saturated fatty acids and/or preferably unsaturated fatty acids. The epoxidized oils also include glycerides of various fatty acids such as linseed oil, which is a glyceride of linolenic, oleic, and linoleic unsaturated acids, and saturated fatty acids. The various fatty acids generally contain from about 10 to about 25 carbon atoms and more desirably from about 14 to about 21 carbon atoms. Generally, the iodine value of the epoxidized oils are from about 0.5 to about 12, and desirably from about 1 to about 3, or 5, or 9. The weight of the oxirane groups in the oil can vary over a wide range such as from about only 1 or 2 percent, more desirably 3 or 4 percent by weight to about 10, 12, or even 15 percent by weight. Preferred oils include epoxidized soybean oils such as paraplex G-62 manufactured by C. P. Hall Company.

The curing agents are generally utilized in amounts of from about 0.5 to about 12 parts by weight per 100 parts by weight of the two or more functionalized acrylic rubbers. When the functionalized rubbers have different functional groups thereon, some self-curing of the rubber occurs (i.e., without cure caused by the curing agent) so that lesser amounts of the curing agent is required such as from about 1 to about 3 parts by weight. When the acrylic rubber functional groups are the same, generally larger amounts of the curing agent is required such as from about 1 to about 5 parts by weight.

Accelerators are optionally utilized to decrease the cure time of the two or more functionalized acrylic rubbers. Suitable accelerators include various salts of fatty acids that do not crosslink the functionalized rubber compounds. Often such compounds also serve as lubricants. The fatty acid salts generally have from 12 or 14 to 20 or 25 carbon atoms. Suitable cations include the alkaline as well as the alkaline earth metals, that is, Groups 1 and 2 of the Periodic Table, as well as the various transitional metals, for example, Groups 11 and 12 of the Periodic Table. Specific examples of accelerators include the sodium, potassium, magnesium, calcium, zinc, etc. salts of fatty acids such as palmitic acid, stearic acid, oleic acid, and the like, and mixtures thereof, with potassium stearate and magnesium stearate being preferred. The amount of the accelerators is small and can vary up to 10 parts by weight and desirably from about 0.1 to about 4 or 5 parts by weight per 100 parts by weight and oftentimes is from about 0.5 to about 1.5 parts by weight of all of the functionalized acrylic rubbers.

The compositions of the present invention can also contain various additives in conventional or suitable amounts. For example, various retardants can be utilized to prevent an unduly quick cure such as any quaternary ammonium salt when epoxidized oils are used as curing agents. Other additives include various antioxidants, various ultraviolet light stabilizers such as various hindered amines, various processing aids, various colorants or pigments such as titanium dioxide, various reinforcing agents or fillers such as clay, silica, carbon black, talc, zinc oxide, and the like, various flame retardants, and various plasticizers such as the nonreactive sulfonamides and trimellitates as well as the various phthalate esters, e.g., dioctyl phthalate.

The co-curing thermoplastic rubber compositions of the present invention desirably are cured via dynamic vulcanization. Dynamic vulcanization means vulcanizing the acrylate rubber of the composition of the present invention under high shear at cure temperatures. As a result, the rubber is generally crosslinked while being blended with the thermoplastic polyester polymer. The rubber can thus be simultaneously crosslinked and dispersed as fine particles of a "microgel" within the thermoplastic, e.g., polyester, matrix or form a crosslinked co-continuous phase with the plastic phase, or a combination thereof. Sources of high shear include Brabender mixers, Banbury mixers, extruders including twin screw extruders, and the like. A unique characteristic of the composition of the present invention is that while the elastomer rubber portion is crosslinked, the compositions nevertheless can be processed and reprocessed by conventional thermoplastic processing techniques and equipment such as extrusion, injection molding, compression molding and the like. An advantage of the thermoplastic elastomers of the present invention is that flashing, scrap, etc., can be salvaged and reprocessed. However, the two or more acrylate polymers are not phase separated, for example, do not contain an inner phase and an outer phase which outer phase may or may not contain a graft linking monomer. That is, the invention is substantially free of such geometric (e.g., outer shell-inner core) acrylic compounds (i.e., less than 5%, less than 3%, less than 1% by weight, and preferably contain no such compounds per 100 parts by weight of all of the acrylic rubbers).

Dynamic vulcanization generally involves adding the co-curing acrylic rubber and functionalized rubber components, the various accelerators, to a high shear mixing device such as a Brabender and the composition heated to a temperature above the melting point of the thermoplastic and mixed. The mixing temperature is generally from about 180° C. to about 260° C., and desirably from about 220° C. to about 240° C. The composition is mixed until the torque curve levels off at which time the composition is mixed for an additional short period of time, for example, about 2 minutes. After mixing and curing, the thermoplastic elastomer compositions were removed from the Brabender mixer and cold pressed into a pancake and subsequently compression molded into plaques for testing.

Suitable uses of the thermoplastic elastomers of the present invention include molded, extruded or shaped articles useful as vehicle (for example, automotive) parts such as seals, tubings, hoses, gaskets, diaphragms, bellows, and the like.

The invention will be better understood by reference to the following examples which serve to illustrate but not to limit the scope of the present invention.

EXAMPLES

Blends of polybutylene terephthalate with two acid functionalized acrylic rubbers were prepared and cured. Three controls as well as blends of at least two functionalized cured acrylic polymers of the present invention were prepared according to the recipe set forth in Table I.

TABLE I

| Material (Pts by Wt.) | 1 | 2 | 3 | 4 | 5 | 6 | 7 | 8 |
|---|---|---|---|---|---|---|---|---|
| DVAs WITH PBT 2002 & ACRYLATE/VAMAC-G BLENDS | | | | | | | | |
| PBT 2002[1] | 33.3 | 33.3 | 33.3 | 33.3 | 33.3 | 33.3 | 33.3 | 33.3 |
| AR-71[2] | 100 | — | — | — | — | — | — | — |
| R40-130A[3] | — | 100 | — | 75 | 50 | 25 | 90 | 10 |
| Vamac-G[4] | — | — | 100 | 25 | 50 | 75 | 10 | 90 |
| Naugard 445[5] | 2 | 2 | 2 | 2 | 2 | 2 | 2 | 2 |
| Kemamide S-221[6] | 2 | 2 | 2 | 2 | 2 | 2 | 2 | 2 |
| Magnesium Oxide | — | 6 | 6 | 6 | 6 | 6 | 6 | 6 |
| Magnesium Stearate | — | 1 | 1 | 1 | 1 | 1 | 1 | 1 |
| Hytemp NPC-50[7] | 6 | — | — | — | — | — | — | — |
| Potassium Stearate | 4 | — | — | — | — | — | — | — |
| INITIAL PHYSICAL PROPERTIES | | | | | | | | |
| UTS, psi | 1230 | 2164 | 2011 | 1617 | 2216 | 2561 | 2254 | 2256 |
| % Elongation | 250 | 271 | 443 | 395 | 336 | 246 | 217 | 327 |
| M 100% | 625 | 1610 | 1045 | 983 | 1376 | 1652 | 1680 | 1210 |
| % Tension Set | 13 | 25 | 25 | 18 | 20 | 25 | 30 | 18 |

TABLE I-continued

| Material (Pts by Wt.) | 1 | 2 | 3 | 4 | 5 | 6 | 7 | 8 |
|---|---|---|---|---|---|---|---|---|
| OS (70 H, 177° C.) | 12 | 7 | 103 | 31 | 49 | 59 | 14 | 79 |
| CS (70 H, 150° C.) | 63 | 86 | 93 | 92 | 93 | 87 | 93 | 93 |
| LTB,C | −18 | −18 | <−60 | −18 | −36 | −48 | −18 | <−60 |
| SHORE A | 77 | 79 | 70 | 75 | 77 | 80 | 81 | 73 |
| HOT AIR AGING AT 177° C. FOR 168 HRS | | | | | | | | |
| UTS, psi | 1890 | 1310 | 1428 | 1011 | 1685 | 1836 | 1513 | 1636 |
| % Elongation | 175 | 139 | 195 | 165 | 274 | 193 | 177 | 260 |
| M 100%, psi | 1030 | 1244 | 1290 | 990 | 1410 | 1520 | 1300 | 1335 |
| Shore A | 78 | 83 | 73 | 80 | 77 | 77 | 84 | 74 |

Note:
R40-130A is similar to AR-71, with carboxyl group.
NOTE:
[1] — Polybutylene terephthalate from Celenese Corporation.
[2] — A vinyl chloroacetate functionalized acrylic elastomer from Nippon Zeon.
[3] — A carboxyl acrylate rubber with carboxyl functionality from Nippon Zeon.
[4] — A carboxylic acid-ethylene-methylacrylate terpolymer from Nippon Zeon.
[5] — An alkylated biphenyl amine antioxidant from Uniroyal Chemical Co.
[6] — A wax-type lubricant from Witco.
[7] — A 50% active masterbatch of quaternary ammonium salt.

The above compositions were prepared utilizing a Brabender mixer. The indicated functionalized acrylic rubber along with the various additives were masticated and melt mixed and the thermoplastic then added. Once the thermoplastic melted, the accelerators were added and mixed. Subsequently, the magnesium oxide curing agent was added and mixed until the torque curve levelled off. Mixing was continued for another 1 to 2 minutes.

The dynamic vulcanizates were pressed into a pancake and compression molded into plaques. Various physical tests were conducted and the properties thereof are set forth in the bottom portion of Table I.

As apparent from Table I, generally improved ultimate tensile strength was obtained. Examples 4–8 unexpectedly had only one low temperature brittle point (LTB).

In a manner similar to that set forth hereinabove with respect to Table I, thermoplastic elastomer compositions were prepared from the recipes of Table II which are set forth below:

TABLE II

| Material (Pts by Wt.) | 9 | 10 | 11 | 12 | 13 | 14 | 15 | 16 |
|---|---|---|---|---|---|---|---|---|
| CURATIVE SCREENING | | | | | | | | |
| PBT 2002 | 33.3 | 33.3 | 33.3 | 33.3 | 33.3 | 33.3 | 33.3 | 33.3 |
| R40-130A | 100 | — | 50 | 50 | 50 | 50 | 50 | 50 |
| Vamac-G | — | 100 | 50 | 50 | 50 | 50 | 50 | 50 |
| Naugard 445 | 2 | 2 | 2 | 2 | 2 | 2 | 2 | 2 |
| Kemamide S-221 | 2 | 2 | 2 | 2 | 2 | 2 | 2 | 2 |
| Magnesium Oxide | 6 | 6 | 6 | — | — | — | — | — |
| Magnesium Stearate | 1 | 1 | 1 | — | — | 1 | — | — |
| NPC-50 | — | — | — | 6 | — | — | — | — |
| Potassium Stearate | — | — | — | 4 | — | — | — | — |
| Paraplex G-62[1] | — | — | — | 8 | — | — | — | — |
| Trisamino[2] | — | — | — | — | 1.5 | — | — | — |
| Mondur E-501[3] | — | — | — | — | — | 6 | — | — |
| Corcat P-16[4] | — | — | — | — | — | — | 4 | — |
| LICA 44[5] | — | — | — | — | — | — | — | 3 |
| PHYSICAL PROPERTIES | | | | | | | | |
| UTS, psi | 2164 | 2010 | 1690 | 1340 | 1570 | 1520 | 650 | 1320 |
| % Elongation | 271 | 443 | 335 | 125 | 145 | 205 | 106 | 125 |
| M 100% | 1610 | 1045 | 1250 | 1080 | 1040 | 750 | 640 | 1060 |
| % Tension Set | 25 | 25 | 13 | — | 15 | 15 | — | — |
| OS (70 H, 177° C.) | 7 | 103 | 38 | 26 | 29 | 36 | 29 | 28 |
| CS (70 H, 150° C.) | 86 | 93 | 70 | 51 | 84 | 72 | 76 | 72 |
| LTB,C | −18 | <−60 | −38 | — | — | — | — | — |
| SHORE A | 79 | 70 | 81 | 80 | 82 | 74 | 72 | 80 |

NOTE:
[1] — An epoxidized soybean oil from C. P. Hall Company.
[2] — An amine curing agent from Angus Chemical Company.
[3] — A prepolymeric isocyanate from Mobay Chemical Company.
[4] — A curative from Texaco.
[5] — An alkoxy titanate from Kenrich Petrochemical Company.

As apparent from Table II, good physical properties were obtained with regard to blends of functionalized acrylic rubbers, i.e., Examples 11–16. Moreover, Example 11 had a very low brittle point temperature, i.e., minus 38° C., and the remaining Examples 12–16 also had very low single temperature brittle points. The oil swell values of Examples 11–16 were quite low in comparison to the utilization of only the terpolymer, that is, Example 10.

In a manner similar to that described with regard to Table I, various thermoplastic elastomer compositions were prepared from the recipes set forth in Table III and tested.

TABLE III

| Material (Pts. by Wt.) | 17 | 18 | 19 | 20 | 21 | 22 | 23 | 24 |
|---|---|---|---|---|---|---|---|---|
| PBT 2002 | 33.3 | 33.3 | 33.3 | 33.3 | 33.3 | 33.3 | 33.3 | 33.3 |
| Acrylate AR-31[1] | 50 | 50 | — | — | 50 | 50 | — | — |
| Acrylate AR-53[2] | — | — | 50 | 50 | — | — | — | — |
| Vamac-G | 50 | 50 | 50 | 50 | — | — | 50 | 50 |
| Acrylate R40 130A2 | — | — | — | — | 50 | 50 | — | — |
| Hytemp 4404[3] | — | — | — | — | — | — | 50 | 50 |
| Potassium Stearate | 4 | 4 | 4 | 4 | 4 | 4 | 4 | 4 |
| Hytemp NPC-50 | — | 6 | — | 6 | — | 6 | — | 6 |
| Paraplex G-62 | — | 4 | — | 4 | — | 4 | — | 4 |
| PHYSICAL PROPERTIES | | | | | | | | |
| UTS, psi | 1240 | 1610 | 1130 | 1310 | 1540 | 1410 | 1250 | 960 |
| % Elongation | 150 | 140 | 150 | 130 | 185 | 120 | 110 | 105 |
| M 100% | 760 | 1030 | 750 | 990 | 960 | 1260 | 1080 | 910 |
| % Tension Set | — | 13 | 11 | 15 | 23 | — | — | — |
| OS (70 H, 150° C.) | 36 | 25 | 34 | 24 | 5 | 10 | 38 | 43 |
| CS (70 H, 150° C.) | 64 | 54 | 57 | 46 | 82 | 58 | 61 | 63 |
| CS (Annealed) | 67 | 48 | 47 | 40 | — | — | 53 | 57 |
| –40 C. LTB Test | P | P | P | P | F | F | P | P |
| SHORE A | 67 | 75 | 66 | 74 | 87 | 83 | 74 | 74 |

NOTE:
[1] — Epoxy functionalized ethyl acrylate.
[2] — Epoxy functionalized ethyl acrylate.
[3] — Hydroxy functionalized ethyl acrylate from Nippon-Zeon.

As apparent from Table III, examples 21 and 22, which did not contain an ethylene-ethyl acrylate-carboxylic acid terpolymer did not result in a minus 40° C. low temperature brittle point. Rather, it cracked before reaching that temperature. Examples 17–20 and 23 and 24 had a single low temperature brittle point. The oil swell values of Examples 17–20 as well as 23–24 were also quite low.

While in accordance with the Patent Statutes, the best mode and preferred embodiment has been set forth, the scope of the invention is not limited thereto, but rather by the scope of the attached claims.

What is claimed is:

1. A thermoplastic elastomer composition, comprising:
    a thermoplastic ester polymer phase and a crosslinked rubber phase, said rubber phase comprising at least two dynamically vulcanized functional acrylic rubbers one of which is a terpolymer, said terpolymer being an ethylene-alkyl acrylate-carboxylic acid terpolymer, said rubbers vulcanized with a curing agent, and wherein the thermoplastic elastomer composition has a single low temperature brittle point.

2. A thermoplastic elastomer composition according to claim 1, wherein said ester polymer is a polyester, a copolyester, a polyester block copolymer, a polycarbonate, an epoxy end capped derivative thereof, or combinations thereof, and wherein the amount of said ester polymer is from about 5 to about 95 parts by weight per 100 parts by weight of said at least two acrylic rubbers, and wherein the amount of said terpolymer is from about 25 to about 75 parts by weight per 100 parts by weight of said at least two acrylic rubbers, and wherein the degree of cure of said thermoplastic elastomer composition is at least 80 percent.

3. A thermoplastic elastomer composition according to claim 2, wherein at least one of said functionalized rubbers is derived from an alkyl acrylate wherein said alkyl group has from 1 to 10 carbon atoms, wherein said functional group is a carboxyl, an epoxy, or a hydroxyl, or combinations thereof, and wherein said terpolymer has from about 35 to about 80 mole percent of ethylene, from about 10 to about 60 mole percent of acrylate, and from about 0.5 to about 10 mole percent of a carboxylic acid.

4. A thermoplastic elastomer composition according to claim 3, wherein said thermoplastic elastomer composition has an oil swell value which is less than the oil swell value of said terpolymer.

5. A thermoplastic elastomer composition according to claim 4, wherein said ester polymer is said polyester, wherein the amount of said ester polymer is from about 20 to about 40 parts by weight per 100 parts by weight of said at least two acrylic rubbers, wherein said terpolymer has from about 45 to about 55 mole percent of ethylene, from about 37 to about 50 mole percent of acrylate, and from about 2 to about 8 mole percent of a carboxylic acid, and wherein the amount of said terpolymer is from about 40 to about 60 parts by weight per 100 parts by weight of said at least two acrylic rubbers, and wherein the degree of cure of said thermoplastic elastomer composition is at least 90 percent.

6. A thermoplastic elastomer composition according to claim 2, wherein said single low temperature brittle point is minus 20° C. or below.

7. A thermoplastic elastomer composition according to claim 5, wherein said single low temperature brittle point is minus 40° C. or below, and wherein the oil swell of said thermoplastic elastomer composition is 30 percent less than the oil swell of said terpolymer.

8. A process for forming a thermoplastic elastomer composition, comprising the steps of:
    blending at least two functional containing acrylic rubbers with a thermoplastic ester polymer and a curing agent, at least one of said acrylic rubbers being an ethylene-alkyl acrylate-carboxylic acid terpolymer, and dynamically vulcanizing said acrylate rubbers and forming a thermoplastic elastomer composition having a single low temperature brittle point.

9. A process according to claim 8, including curing said thermoplastic elastomer composition so that it has a degree of cure of at least 80 percent, and including forming said thermoplastic elastomer composition so that it has a thermoplastic phase and a rubber phase, wherein said ester polymer is a polyester, a copolyester, a polyester block copolymer, a polycarbonate, an epoxy end capped derivative thereof, or combinations thereof, wherein the amount of said ester polymer is from about 15 to about 60 parts by weight per 100 parts by weight of at least two said acrylic rubbers, and wherein the amount of said terpolymer is from about 25 parts to about 75 parts by weight per 100 parts by weight of said at least two acrylic rubbers.

10. A process according to claim 9, wherein said degree of cure is at least 90 percent, wherein said terpolymer has from about 35 to about 80 mole percent of ethylene, from about 10 percent to about 60 mole percent of acrylate, and from about 0.5 to about 10 mole percent of a carboxylic acid, wherein the amount of said curing agent is from about 0.5 to about 12 parts by weight per 100 parts by weight of said at least two acrylic rubbers, and including forming said thermoplastic elastomer having an oil swell value which is at least 30 percent less than the oil swell value of said terpolymer.

11. A process according to claim 10, wherein said polymer is said polyester, wherein said single low temperature brittle point is minus 20° C. or below, wherein one of said acrylic rubbers is a functionalized acrylic acrylate wherein said alkyl portion has from 1 to 10 carbon atoms, and wherein said functional group is a carboxyl, an epoxy, or a hydroxyl, or combinations thereof.

12. A process according to claim 11, wherein said single low temperature brittle point is minus 40° C. or below.

13. A thermoplastic elastomer composition, comprising:

a blend of dynamically vulcanized acrylic rubbers and a thermoplastic ester polymer, said acrylic rubbers comprising a blend of at least two functionalized acrylic rubbers cured by a curing agent, said functional groups being a carboxyl group, an epoxy group, a hydroxyl group, or combinations thereof, the amount of said functional groups being up to 10 mole percent based upon the total number of repeat units in said functionalized acrylic rubber, and wherein said cured rubber has a degree of cure as measured by weight percent insoluble in toluene at 20° C. of from about 80 to about 100 percent.

14. A thermoplastic elastomer composition according to claim 13, wherein the thermoplastic elastomer composition has a single low temperature brittle point of minus 20° C. or below, wherein said ester polymer is a polyester, a copolyester, a polyester block copolymer, a polycarbonate, an epoxy end capped derivative thereof, or combinations thereof, wherein the amount of said ester polymer is from about 15 to about 60 parts by weight per 100 parts by weight of said at least two acrylic rubbers, wherein at least one of said acrylic rubbers is an ethylene-alkyl acrylate-carboxylic acid terpolymer, wherein the amount of said terpolymer is from about 25 to about 75 parts by weight per 100 parts by weight of said at least two acrylic rubbers, and wherein one of said acrylic rubbers is an alkyl acrylate wherein the alkyl group has from 1 to 10 carbon atoms.

15. A thermoplastic elastomer composition according to claim 14, wherein said ester polymer is a polyester, wherein said terpolymer has from about 35 to about 80 mole percent of ethylene, from about 10 to about 60 mole percent of acrylate, and from about 0.5 to about 10 mole percent of a carboxylic acid, and wherein said degree of cure is from about 90 to about 100 percent.

* * * * *